United States Patent [19]
Ennis

[11] Patent Number: 6,012,574
[45] Date of Patent: Jan. 11, 2000

[54] HOLDER

[75] Inventor: Paul Ennis, Cardiff, United Kingdom

[73] Assignee: Zenith Print & Packaging Limited, Pontypridd, United Kingdom

[21] Appl. No.: 09/080,316

[22] Filed: May 15, 1998

[30] Foreign Application Priority Data

May 15, 1997 [GB] United Kingdom .................. 9709820

[51] Int. Cl.$^7$ ................................................ B65D 85/57
[52] U.S. Cl. ...................... 206/308.1; 206/310; 206/312
[58] Field of Search ................... 206/308.1, 309, 206/310, 311, 312, 313, 232

[56] References Cited

U.S. PATENT DOCUMENTS

| | | | |
|---|---|---|---|
| 4,421,230 | 12/1983 | Stanton | 206/378 |
| 4,709,812 | 12/1987 | Kosterka | 206/310 |
| 5,186,327 | 2/1993 | McCafferty et al. | 206/313 |
| 5,188,229 | 2/1993 | Bernstein | 206/312 |
| 5,421,453 | 6/1995 | Harrer et al. | 206/312 |
| 5,529,182 | 6/1996 | Anderson et al. | 206/308.1 |

FOREIGN PATENT DOCUMENTS

| | | |
|---|---|---|
| 0503171 | 9/1992 | European Pat. Off. . |
| 0576256 | 12/1993 | European Pat. Off. . |
| 0614189 | 9/1994 | European Pat. Off. . |
| 296 04 722 U | 6/1996 | Germany . |
| 765729 | 1/1957 | United Kingdom . |
| 2187442 | 9/1987 | United Kingdom . |
| 2297539 | 8/1996 | United Kingdom . |
| 9619808 | 6/1996 | WIPO . |

*Primary Examiner*—Paul T. Sewell
*Assistant Examiner*—J. Mohandesi
*Attorney, Agent, or Firm*—Edwin D. Schindler

[57] ABSTRACT

A holder for an optical storage disc comprises a retaining element for receiving the disc and a support element to which the retaining element is mounted, The surface of the retaining element is formed with at least one projection for gripping the disc which it, in part, underlies. The support element comprises a piece of sheet material formed with at least one aperture through which the projection of the retaining element extends.

8 Claims, 2 Drawing Sheets

HOLDER

BACKGROUND OF THE INVENTION

1. Field of the invention

The present invention relates to a holder and more particularly to a holder for holding an optical data storage disc.

2. State of the Art

A variety of holders are known for holding optical data storage discs, These holders typically take the form of a flexible sleeve or a rigid, injection moulded case.

An injection moulded case provides considerable support and protection for an optical disc, and may therefore, in certain circumstances, be more desirable than a flexible sleeve. However, such a case is still limited in that it is bulky and brittle, and is relatively costly to produce in terms of the materials, manufacturing tools and processes required.

An alternative arrangement which has been proposed comprises a laminate of two flexible sheets, one of which is formed with an aperture of the same diameter as an optical disc so that a disc may be frictionally retained within the aperture.

Whilst this arrangement overcomes some of the limitations of injection moulded cases, in order to be effective, it requires the two sheets to be adhered together around the peripheral edge of the aperture so that the disc does not slip between them.

SUMMARY OF THE INVENTION

We have now devised an arrangement which overcomes all of the above-mentioned limitations of existing holders.

In accordance with the present invention, there is provided a holder comprising a retaining element for receiving an article and having a surface at least part of which, in use, underlies the article, said surface being formed with one or more projections for gripping the article, and a support element to which said retaining element is mounted, said support element comprising a sheet formed with one or more apertures through which the projection or projections of the retaining element extend.

It will be appreciated that the retaining element may be formed of a relatively insubstantial material which is easily formed to produce the projection or projections, whilst the support element may be formed of a more substantial material to impart the necessary rigidity to the structure. The holder is therefore relatively straightforward and cheap to produce.

Also, the arrangement prevents the article which the holder is to hold from slipping between the retaining element and support element, and therefore it is not a strict requirement that these two elements be adhered together. Where it is desired for the two elements to be adhered together, it will be appreciated that the adhesive need not be applied as accurately or uniformly as is required to produce the prior art laminated holder, discussed above.

By passing the projection or projections of the retaining element through the aperture or apertures of the support element, the arrangement prevents substantial lateral movement of the retaining element relative to the support element. Also, the projection or projections of the retaining element may form a frictional or interference fit within the aperture or apertures of the support element, and so prevent perpendicular movement of the retaining element relative to the support element.

Preferably the or each projection of the retaining element is formed of a resilient material and is preferably arranged to frictionally engage a portion of the article which the holder is to hold. Alternatively, the or each projection of the retaining element may be formed with one or more indentations and/or projections for retaining a portion of the article.

A further limitation of injection moulded cases is that, where such a device is used to retain an optical disc, the disc is typically held in place by a spigot comprising a plurality of resilient fingers which engage the inner edge of an aperture formed in the centre of the disc. Considerable leverage must be applied to the edge or the disc to attach it to the spigot, or release it from the spigot, which may result in damage to the spigot or to the disc itself.

A holder according to the present invention may overcome this limitation by having the or each projection of the retaining element arranged to engage only the peripheral edge of the compact disc or other article which the holder is to hold.

Preferably the retaining element comprises a sheet having the or each projection extending substantially perpendicularly from a surface thereof. Preferably the sheet comprises a plastics material, and preferably the or each projection comprises a blister which is vacuum formed into the surface of the plastics sheet.

Preferably the one or more perpendicular projections of the retaining element define or partially define a flanges adjacent the peripheral edge of that element. Preferably a portion of the support element overlaps at least this flange portion of the retaining element.

Preferably the one or more projections of the retaining element define a storage region into which the article may be fitted, which storage region is preferably circular so that, for example, an optical data storage disc may be held adjacent to and parallel with the surface of the retaining element. Preferably the circular storage region is defined by a single and preferably continuous annular projection.

It will be appreciated that where a planar article such as an optical disc is engaged by more than one projection or by a single, discontinuous projection, then a portion of the peripheral edge is accessible to provide a purchase upon the disc to release it from the holder. Alternatively, or additionally, the retaining and support elements may be formed of a resiliently flexible material so that an article may be released from the retaining element by flexing the holder. Another preferred arrangement, which enables an article to be readily released from the holder, is one in which respective apertures formed in the retaining and support elements form a passage through which a force may be exerted upon the article, from the opposite side of the retaining element, to expel it from the holder.

Preferably the support element comprises first and second opposed portions arranged to secure a portion of the retaining element therebetween. This arrangement as well as imparting further rigidity to the structure, will also prevent substantial perpendicular movement of an otherwise unsecured retaining element relative to the surface of the support element. Preferably the opposed portions are arranged so that at least the flange portion of the retaining element is disposed therebetween.

The opposed surfaces of the first and second portions of the support element are preferably adhered to one another by one or more areas of adhesive. However, each portion may instead be adhered to a respective overlapping portion of the retaining element.

Preferably the support element comprises a portion arranged to pivot relative to the retaining element to cover the otherwise exposed parts of a held article.

Preferably the support element comprises a single folded sheet, which is preferably formed from a cardboard material. Forming the support element from cardboard has a number of advantages.

Firstly, print may be applied to one or more surface areas of the support element, thereby overcoming a limitation of injection moulded cases which require separate printed material to be affixed to the case.

More importantly, it will be appreciated that, where the support element comprises a relatively cheap bio-degradable material such as cardboard, the only non-biodegradable material in the holder is that from which the retaining element is formed. According to the present invention, only a relatively small amount of that (expensive) material is required, and therefore, for both environmental as well as economic reasons, the holder provides an improvement over an injection moulded case, the whole or a substantial part of which must be formed of plastics material.

Where the support element comprises a pair of opposed portions and a pivoting portion, preferably the three portions are arranged linearly so that the fold line between the opposed portions extends parallel to the fold line between those portions and the pivoting portion.

Also, whilst it will be appreciated that the apertured one of the opposed portions of the support element may comprise either of those portions, the apertured portion preferably comprises the portion remote from the pivoting portion. Thus, in the assembled device, both the pivoting portion and the apertured portion of the support element are folded towards the same surface of their intermediate portion, the pivoting portion and the intermediate portion being sufficiently spaced apart to accommodate the thickness of the retaining element between their opposed faces, The surface of the pivoting portion of the support element may be sufficiently spaced apart from the tops of the one or more projections of the retaining element to accommodate an additional article such as a booklet therebetween, which booklet or other article may be adhered to or stitched to the support element.

A number of variants of the present invention are envisaged. For example, the holder may be adapted to receive more than one article, either by attaching the additional article or articles to the retaining element or by providing one or more additional projection-bearing elements.

In the former case, the retaining element may comprise a planar element having projections extending from one or both of its opposite surfaces. Where projections extend from both surfaces, then preferably the retaining element is disposed between first and second opposed planar portions of the support element, each portion being formed with one or more projection-receiving apertures.

In the latter case, the projections of the or each additional projection-bearing element may extend through one or more apertures formed in one or other of the opposed portions of the support element. Alternatively, where the support element comprises a pivoting portion, the projections may extend through apertures formed in that portion, preferably so that a plurality of articles may be held adjacent the opposed inner surfaces of the folded holder.

The holder is preferably provided with a sleeve into which it may be inserted for presentation purposes and to provide additional protection for an article contained therein.

Also in accordance with the invention, there is provided a holder for a planar item, comprising a retaining element for receiving the item and having a surface at least part of which, in use, underlies the item and also having one or more vacuum-formed projections arranged to grip the item, and a support element to which said retaining element is mounted.

In this holder, the support element may comprise a sheet formed with one or more apertures through which the vacuum-formed projection or projections of the retaining element extend. Instead, the retaining element may be adhered or otherwise bonded to the support element.

An embodiment of the present invention will now be described by way of an example only and with reference to the accompanying drawing, in which:

DETAILED DESCRIPTION OF THE PREFERRED EMBODIMENT

Figure 1:
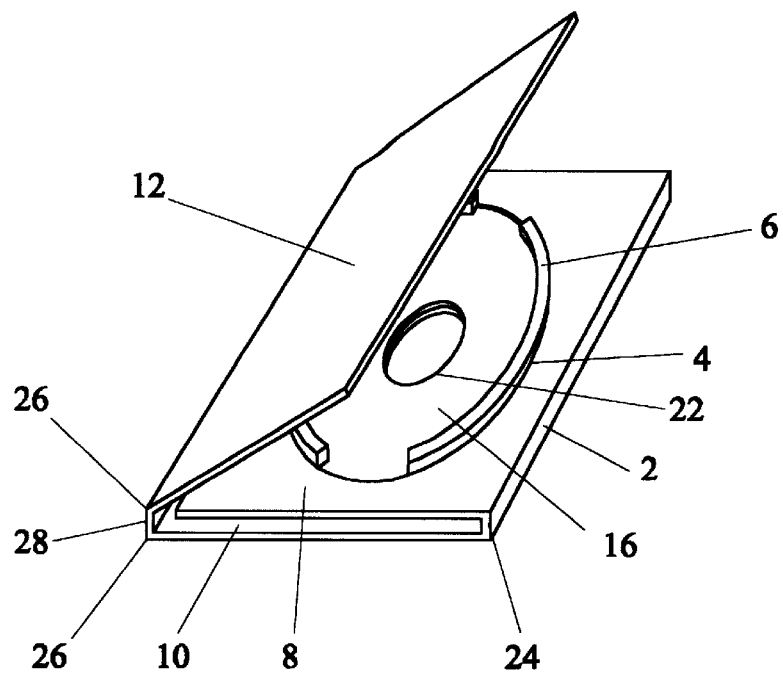
FIG. 1 is a perspective view of a holder in accordance with the present invention.

Referring to FIG. 1 of the drawings, a holder is shown comprising an outer support structure 2, and an insert 4 having an annular projection 6 for gripping the peripheral edge of an optical storage disc, The support structure 2 (as shown unfolded in FIG. 2) comprises a strip of cardboard sheet material, two portions 8 and 10 of which are coated with adhesive and folded together to form the holder base. A third portion 12 forms a pivoting cover for the holder.

The end portion 8 of the cardboard strip is formed with a circular aperture 14 to receive the annular projection 6 of the insert 4.

Figure 3:
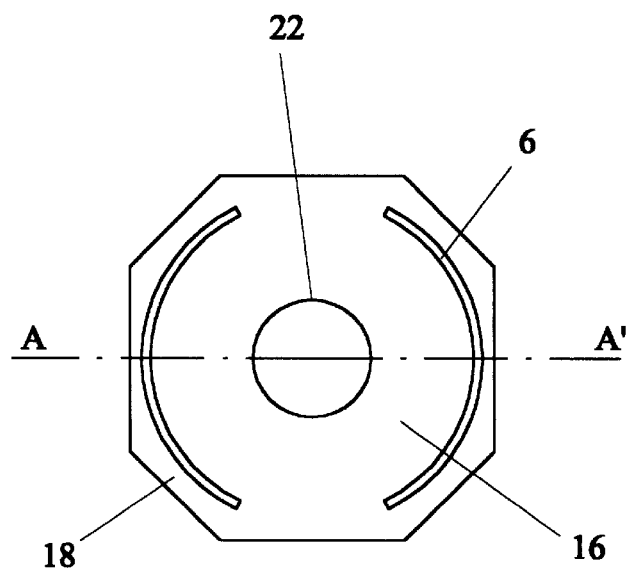
FIG. 3 is a plan view of an insert for fitting to the structure of FIG. 2.
Figure 4:
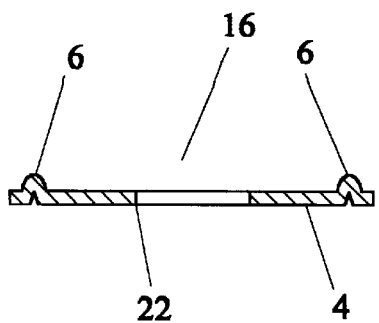
FIG. 4 is a sectional view through the insert of FIG. 3, along the line A,A'.

The insert 4 is shown in detail in FIGS. 3 and 4 and comprises a plastics sheet into which the annular projection 6 is vacuum formed, The annular projection 6 defines a circular recess 16 within which an optical storage disc may be arranged so that the disc is gripped by its peripheral edge, and a flange 18 which extends around the peripheral edge of the insert.

With the insert 4 fitted to the support structure 2 as shown in FIG. 1, the flange 18 is retained between overlapping portions of the support structure, thereby securing the insert in place.

Referring again to FIG. 2, a second aperture 20 is formed in the centre portion 10 of the strip. In the assembled holder, this aperture aligns with a corresponding aperture 22 formed in the centre of the insert 4 to form a passage through which a finger may be pushed to release a disc from the holder.

Figure 2:
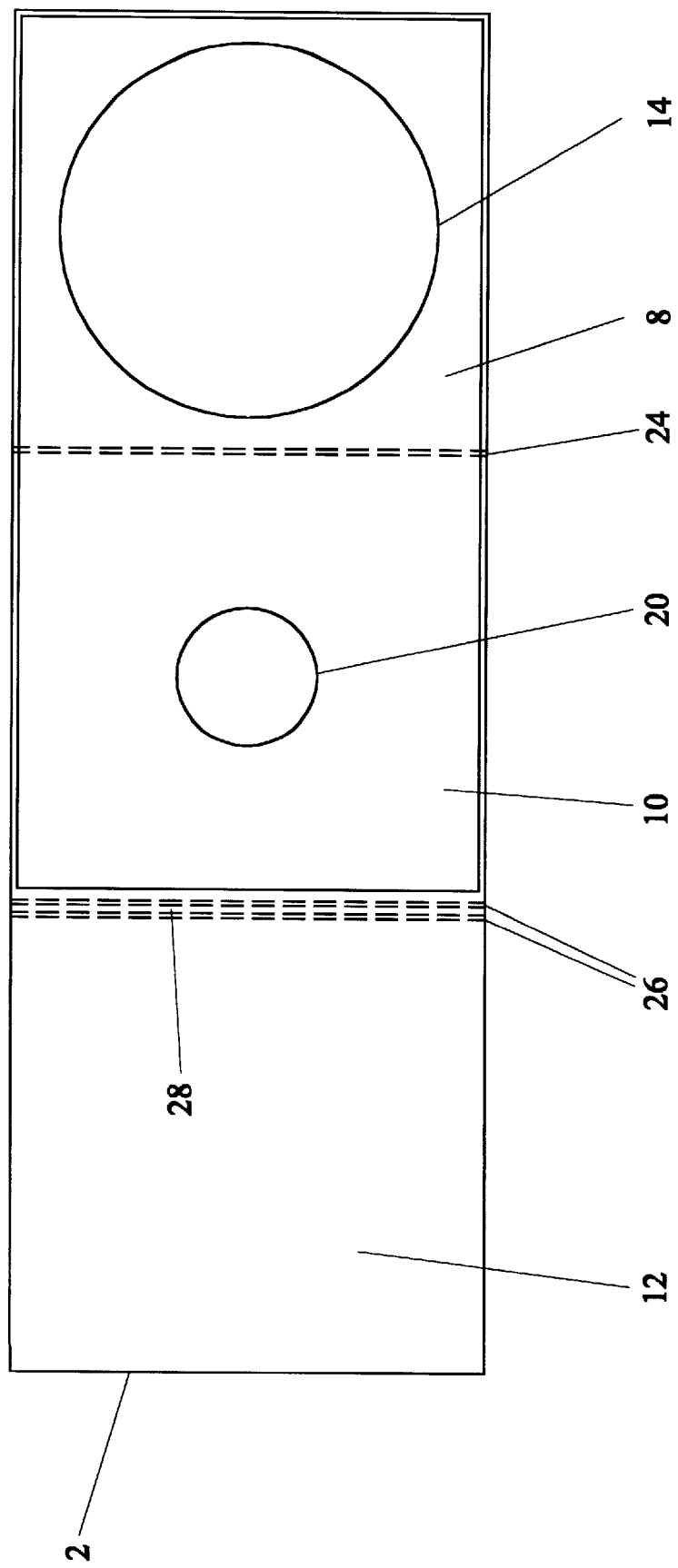
FIG. 2 is a plan view of the unfolded outer structure of the holder of FIG. 1.

To assist folding, the strip of FIG. 2 is formed with a single crease 24 between its first and second portions, 8 and 10, and double crease 26 between its second and third portions, 10 and 12. In the assembled holder, the double crease 26 provides a spine 28 which ensures that the cover portion 12 and the second portion 10 are sufficiently spaced apart to accommodate the thickness of the insert 4 between their opposed faces. The spine 28 may also provide sufficient clearance between the surface of the cover portion 12 and the top of the annular projection 6 to accommodate an additional item such as a booklet (not shown) between them. The booklet or other item may, for example, be adhered or stitched to the spine.

The holder thus described provides an efficient means for supporting an article such as an optical storage disc, the holder being more straightforward, inexpensive and environmentally friendly to produce than existing rigid holders such as injection moulded cases.

I claim:

1. A holder comprising a retaining element for receiving an article and a support element to which said retaining element is mounted, said retaining element comprising a piece of resiliently flexible plastic sheet material having a projection on its upper surface, the projection defining a socket for receiving the article as an interference fit, and said support element comprising a piece of sheet material overlying the upper surface of said retaining element and being formed with an aperture through which the projection of said retaining element extends.

2. The holder according to claim 1, wherein the projection of said retaining element forms an interference fit within the aperture of said support element.

3. The holder according to claim 1, wherein the socket defined by the projection of said retaining element is circular.

4. The holder according to claim 3, wherein the projection of said retaining element includes a discontinuous annular projection.

5. The holder according to claim 1, wherein said piece of sheet material of said support element is a first piece of sheet material, said support element further comprising a second piece of sheet material underlying a lower surface of said retaining element.

6. The holder according to claim 5, wherein said first piece and said second piece of sheet material of said support element comprise respective portions of a folded piece of sheet material.

7. The holder according to claim 5, wherein said retaining element and said second piece of sheet material of said support element have respective apertures formed therethrough, with the respective apertures forming a passage through which a force is able to be exerted upon the article for expelling the article from said holder.

8. The holder according to claim 1, wherein said support element is made of a resiliently flexible material.

* * * * *